(12) United States Patent
McGee et al.

(10) Patent No.: US 6,315,102 B1
(45) Date of Patent: Nov. 13, 2001

(54) HIGH-SPEED OSCILLATING FEEDER

(75) Inventors: Michael McGee; Ron Rieger; Dennis Lenart; Johnny Black; Terry Brinkerhuff, all of Waco, TX (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/505,837

(22) Filed: Feb. 17, 2000

(51) Int. Cl.[7] ................................................. B65G 17/32
(52) U.S. Cl. ............................................. 198/384; 198/378
(58) Field of Search ................................... 198/384, 389, 198/411, 412, 414, 377.1, 378, 397.02, 347.05

(56) References Cited

U.S. PATENT DOCUMENTS

| | | | |
|---|---|---|---|
| 3,282,396 | * 11/1966 | Tomelleri | 198/384 |
| 3,580,381 | * 5/1971 | Kilner | 198/384 |
| 4,958,667 | * 9/1990 | Rece et al. | 198/378 X |
| 5,579,890 | * 12/1996 | Harris | 198/378 X |
| 5,649,406 | * 7/1997 | Sonntag et al. | 198/378 X |
| 5,826,696 | 10/1998 | Rupp et al. | 198/392 |
| 5,826,697 | 10/1998 | Mochizuki et al. | 198/392 |

FOREIGN PATENT DOCUMENTS

| | | |
|---|---|---|
| 09290911 | 2/1998 | (JP) . |
| WO 85/02600 | 6/1985 | (WO) . |

\* cited by examiner

*Primary Examiner*—James R. Bidwell
(74) *Attorney, Agent, or Firm*—Fitzpatrick, Cella, Harper & Scinto

(57) ABSTRACT

The present invention incorporates an oscillating sorting and feeding apparatus for sequentially sorting and feeding a plurality of objects in a serial arrangement, where the objects are sorted into a specific orientation. The apparatus includes a hollow receiving member having a generally cylindrical shape and an inner wall. The receiving member includes an inlet adjacent one end for receiving a plurality of randomly orientated objects, and also includes an outlet at the other end for sequentially feeding out correctly orientated objects in a serial arrangement.

19 Claims, 5 Drawing Sheets

HIGH-SPEED OSCILLATING FEEDER

BACKGROUND OF THE INVENTION

1. Field of the Invention

The present invention relates to methods and apparatuses for sorting and feeding a plurality of objects, and more particularly to an apparatus for sequentially sorting and feeding candies in a specific orientation for packaging in a parallel arrangement at high speed.

2. Related Background Art

Many popular candies, snacks and other foodstuffs are often packaged together in multiple flavor or multiple color groupings. These groupings are often packaged in single, in-line rows or what is commonly referred to in the art as "stickpacks". An example of such a candy arranged in a stickpack is a Starburst® fruit candy. Other types of candies, especially those having block shapes, like chocolates and the like, are also packed in stickpacks.

It has been a problem that the existing techniques for packaging stickpacks require excessive amounts factory floor space and complicated equipment. Another problem is that the speed of sorting candies in existing equipment is quite slow. In addition, physical monitoring of the equipment is necessary in order to prevent candies from jamming within the equipment. When jamming occurs, the equipment must be shut down and an operator summoned to un-jam the candies by hand. These problems result in an economically unsatisfactory overall candy making and packaging operation.

SUMMARY OF THE INVENTION

Accordingly, the present invention presents new apparatuses and methods for providing correctly orientated objects at high speed, in a much smaller space without requiring human intervention to dislodge jammed candies.

Thus, it is an object of the present invention to provide a high-speed sorting and feeding apparatus which is simple in design, takes up less space, and operates at high speed.

It is another object of the present invention to provide a sorting and feeding apparatus which is low cost.

It is another object of the present invention to provide a sorting and feeding apparatus for sorting and feeding a plurality of objects in a specific orientation.

It is yet another object of the present invention to provide a sorting and feeding apparatus that sorts and feeds a plurality of different color/flavor candies in individual lanes for assembly into a stickpack.

It is yet another object of the present invention to provide a sorting and feeding apparatus that sorts and feeds a plurality of different objects of the same dimensions.

In one aspect of the present invention, an apparatus for sequentially feeding a plurality of objects in a line, where each object is placed at a specific orientation, includes a hollow receiving member having a generally cylindrical shape and an inner wall and an inlet adjacent one end for receiving a plurality of randomly orientated objects, and an outlet at the other end for sequentially feeding out correctly orientated objects in a line. The apparatus further includes a generally cylindrical inner member centrally aligned within the hollow receiving member. The inner member includes an outer wall which is spaced apart from the inner wall of the hollow receiving member to define a space adapted for receiving a correctly orientated object for sequential feeding. The upper portion of the cylindrical inner member inclines toward the inner wall of the hollow receiving member. At least one of the generally cylindrical inner member and the hollow receiving member rotate relative to one another in a feeding direction to sequentially feed the objects out of the outlet. In addition, at least one of the inner member and receiving member also rotate relative to one another in a direction opposite to the feeding direction at predetermined intervals for a predetermined period of time to clear objects that jam.

In another aspect of the present invention, an apparatus for supplying a plurality of different objects at a specific orientation and in a parallel arrangement includes a plurality of feeders as described above, each for sequentially feeding a single line of one type of correctly orientated objects. The apparatus according to this aspect also includes a plurality of transport conveyors each having an end positioned at one of the outlets of the feeders for transporting a specific type of correctly orientated object away from one of the feeding devices. The transport conveyors are positioned along side each other to provide a plurality of correctly orientated objects for packaging in a stickpack.

In yet another aspect of the current invention, a method for sequentially organizing a plurality of objects includes the steps of feeding a plurality of randomly orientated objects between an inner wall of a hollow receiving member, having a generally cylindrical shape, and an outer wall of a generally cylindrical inner member. The outer wall of the inner member is spaced apart from the inner wall of the hollow receiving member to define a space adapted for receiving a correctly orientated object. The method also includes the step of rotating at least one of the inner member and the receiving member relative to one another in a feeding direction, and rotating at least one of the receiving member and the inner member relative to one another in a direction opposite to the feeding direction at predetermined intervals for a predetermined period of time.

One of the unique features of the present invention is the ability of the apparatus to un-jam candies that get stuck within the equipment. This is accomplished by the counter rotation, or oscillation of rotation, of the sorting device which causes stuck candies to loosen and be placed in a position in which they can be sorted. As a result, an operator is no longer necessary to manually fix the jammed pieces, and equipment no longer must be shut down to do so.

These and other objects and advantages of the present invention shall become more apparent from the accompanying drawings and the description thereof.

BRIEF DESCRIPTION OF THE DRAWINGS

The accompanying drawings, which are incorporated in and constitute a part of this specification, illustrate various embodiments of the invention and, together with the general description of the invention given above and the detailed description given below, serve to explain the principles of the invention.

DETAILED DESCRIPTION OF THE PREFERRED EMBODIMENTS

Figure 1:
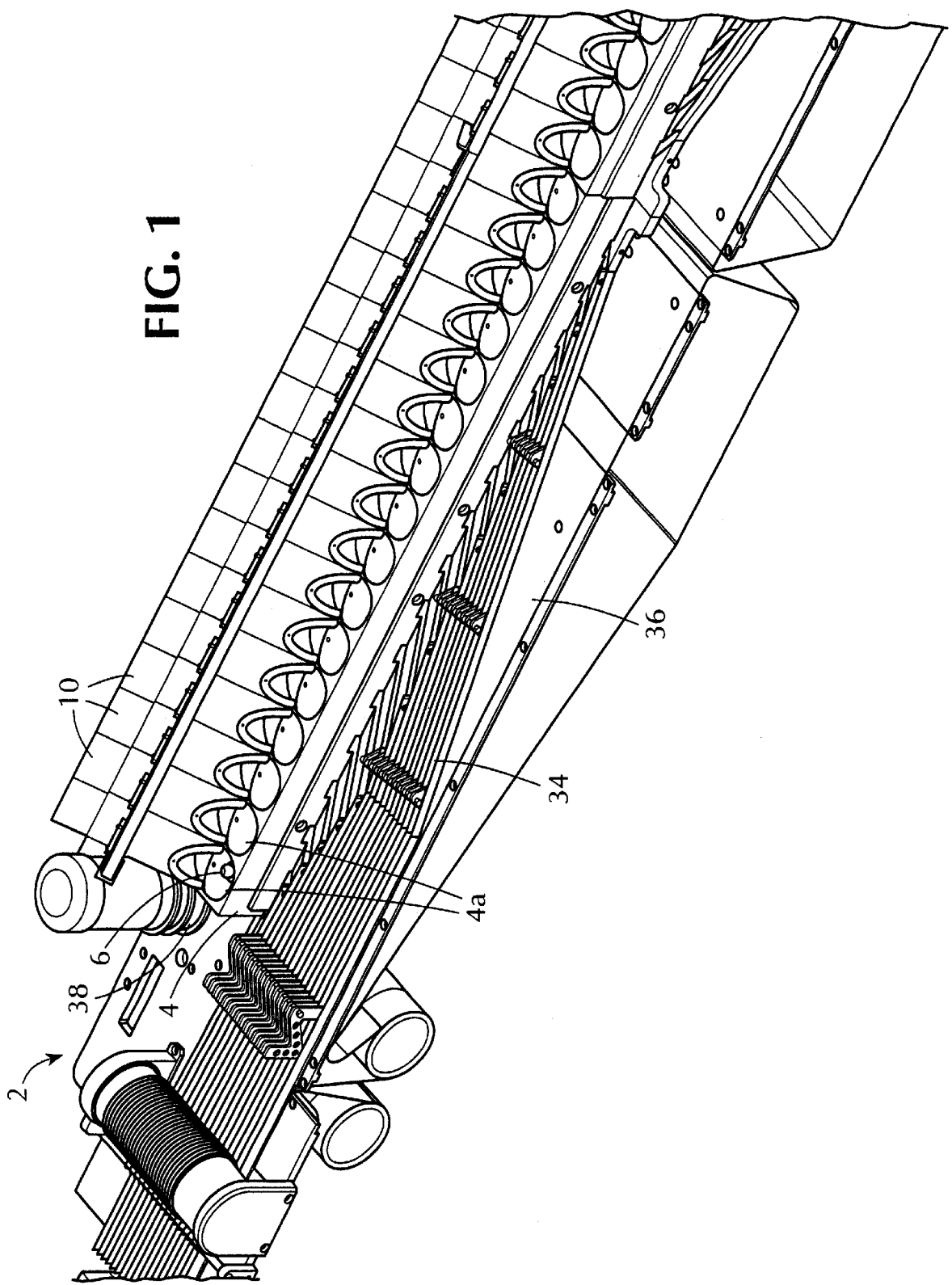
FIG. 1 is a perspective view of a feeding and sorting apparatus for sorting a plurality of different flavor/color candies according to the present invention.
Figure 2:
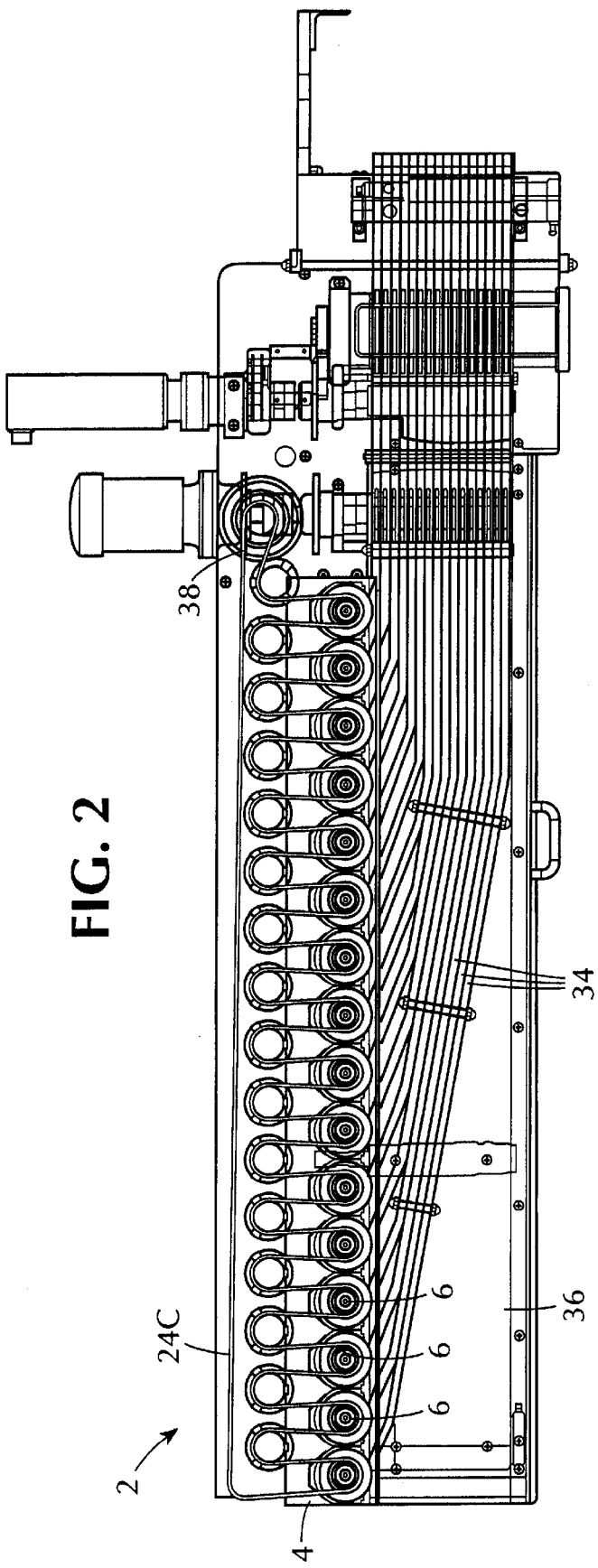
FIG. 2 is a top view of the feeding and sorting apparatus as illustrated in Figure.
Figure 3:
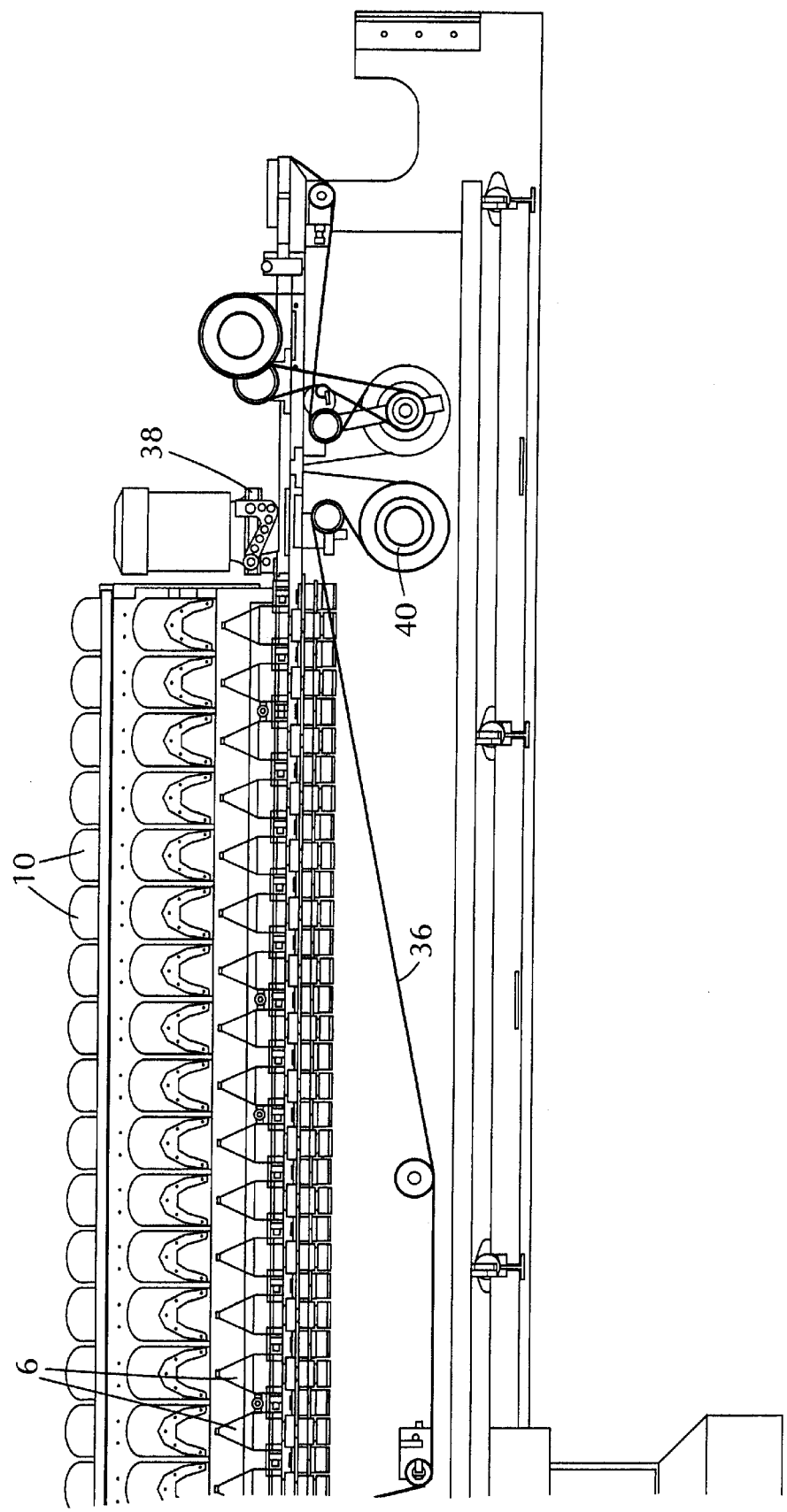
FIG. 3 is a side view of the feeding and sorting apparatus as illustrated in FIG. 1.
Figure 4:
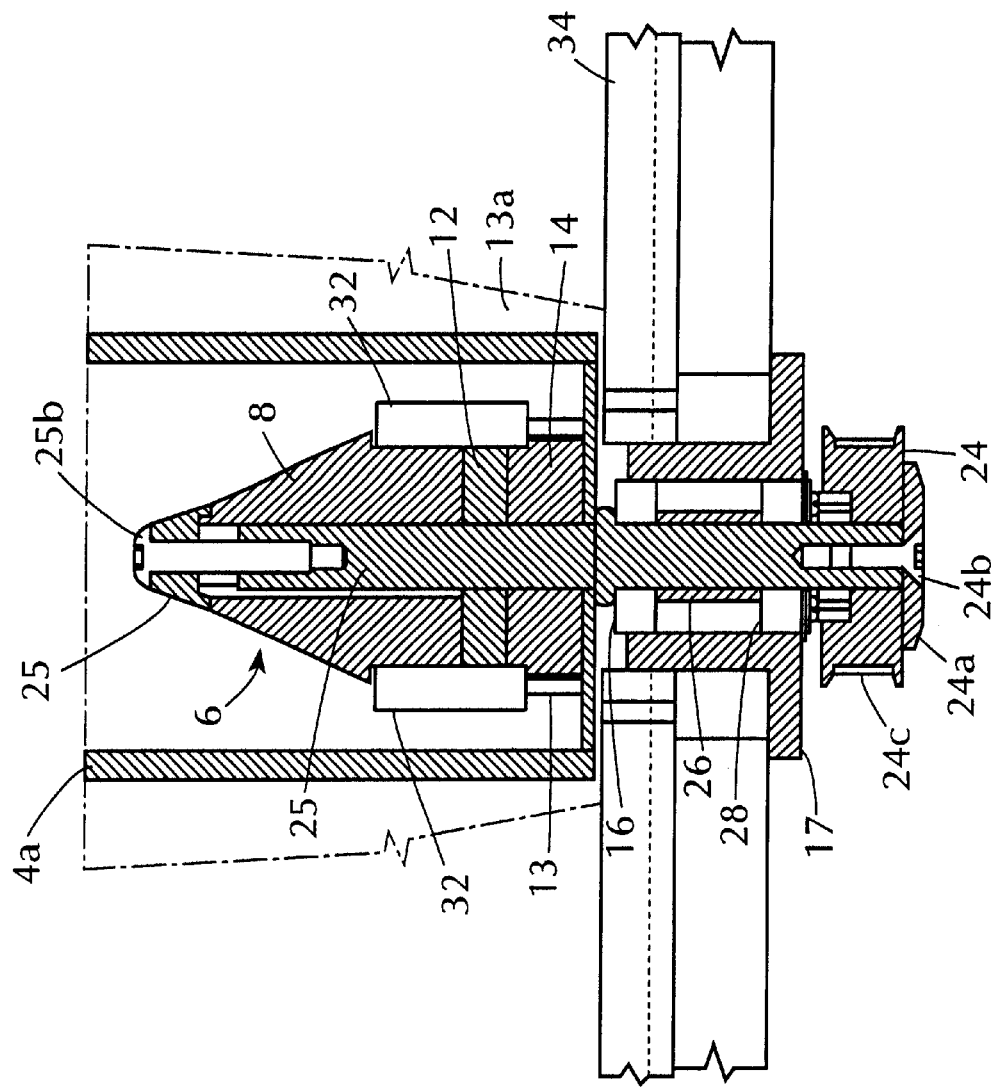
FIG. 4 is a side-sectional view of an individual feeding and sorting apparatus for sorting a single flavor/color candy according to the present invention.
Figure 5:
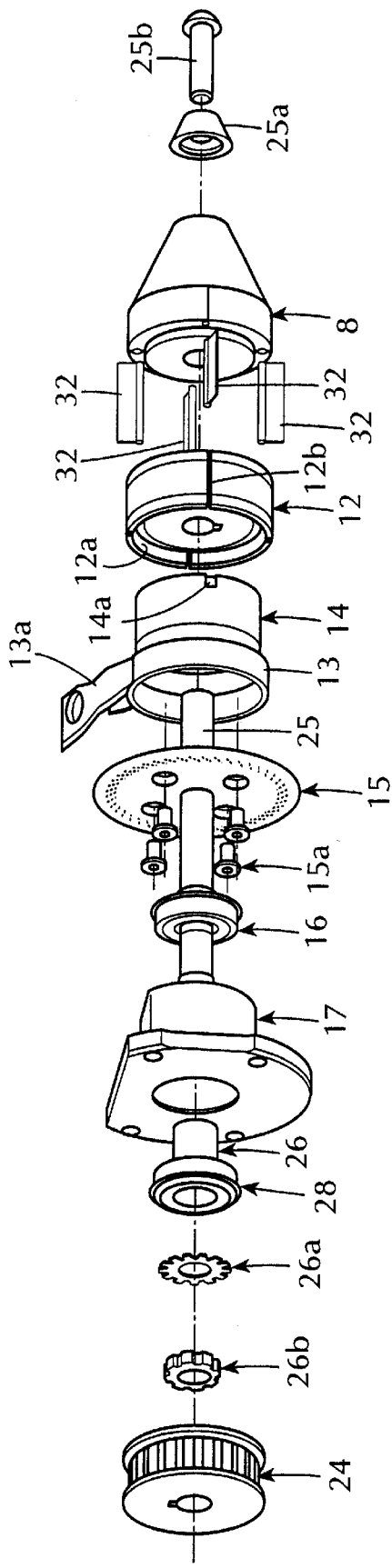
FIG. 5 is an exploded view of the inner workings of the feeding and sorting apparatus according to the present invention.

Referring to FIGS. 1–5, an exemplary feeding and sorting apparatus 2 of this invention is shown comprising a cone block 4 having a rectangular array of cylinders 4a, each opening containing a corresponding cone assembly 6. Each cone assembly 6 rotates within a corresponding cylinder 4a to sort and feed candies received in a randomly orientated manner from a feeding hopper 10 positioned over each cylinder in a constant and steady flow. Although the illustrated cylinders are centrally aligned within the cone block, the invention is not limited to such an arrangement.

Each cone assembly 6 includes a cone body 8 and a spacer 12, each having substantially equal diameters, and a base 14. The cone body 8, spacer 12, base 14 are affixed to a cone shaft 25, by cone cap 25a and hex bolt 25b. The base 14 has a diameter slightly smaller than the cone body 8 and spacer 12, and fits within a recess 12a formed in the base of the bottom of the spacer 12. The ends of a plurality of brushes 32 are affixed to the bottom of the cone body 8, and fit within corresponding slots 12b found in the spacer 12 and within corresponding slots 14b provided in an upper portion of cone base 14.

Wrapped around the base 14 and just below slots 14a is cone ring 13 having a guiding arm 13a. The cone ring 13 remains affixed within the cylindrical opening, relative to the spinning cone assembly, so that candies propelled from the rotating cone assembly are guided out of an outlet provided on the bottom of the cylinder in the bottom of the cone block.

Affixed to the base 14 by four recessed bolts 15a is a vacuum disk 15, which includes a plurality of holes 15b for air to flow through. During operation, a vacuum pump (not shown) draws air from the open end of the cone block, down through the air holes which aids in ushering the candies from the top of the cone assembly down through the cylinder 4a to the bottom. The air flow also aids in cleaning the cylinder by removing any small particles that may be therein.

The cone body 8, spacer 12 and base 14 are positioned on a cone shaft 25. The cone shaft 25 includes bearings 16 and 28 to insure smooth rotation and operation, and bearing spacer 26. The entire assembly is affixed to a bearing housing 17 by lock washer 26a and lock nut 26b. A timing pulley 24, attached to the bottom of each shaft with washer 24a and bolt 24b, receives a timing belt 24c which is propelled by a motor 38.

Candies are sorted at high speed by the action of the cone assembly rotating within the cylinder. This rotation arranges the objects in the particular, correct orientation for ultimate arrangement in a stickpack in the following manner. Randomly orientated objects are fed into the inlet of a cylinder and fall down from the upper portion of the cone assembly to the space between the cone assembly and the cylinder. This space is adapted for receiving a correctly orientated candy, being slightly larger than the width of the candy. The candies encounter brushes 32 which sweep them around the cylinder while the candies continue their descent to the bottom of the cylinder. When the candies finally arrive at the bottom of the cylinder, they are positioned in a particular arrangement for feeding out of the outlet. At this point, the brushes 32 propel the candies out of the bottom of the cylinder through the outlet.

It will be appreciated by one of ordinary skill in the art, that rotation action which aids in arranging the candies, may be accomplished by rotating at least one of the cone assembly or the cylinder relative to one another.

Thus, between the time randomly arranged objects fed by the hoppers reach the bottom of each cylinder, they are sorted at high speed in a correctly orientated position and relayed out the bottom of the cylinder at the outlet tangentially positioned at the base of each cylinder.

Positioned adjacent each outlet is the beginning of a transport lane 34 which directs a single line of sorted, correctly orientated objects away from the cone block. Initially, objects are pushed out of the outlet and into the transport lane 34 by the rotation of the cone assembly within the cylinder by the brushes 32. Once the objects are in the transport lane, however, a common conveyor 36 belt positioned below all the transport lanes acts as both a bottom support to each lane and also supplies the motion to drive the objects through each lane and ultimately to packaging equipment.

The transport lanes 34 may angle out parallel to one another from the cone block, as shown in the figures. All then lanes may be directed in a direction parallel to the cone block, so that the individual objects can then be arranged into a parallel arrangement to be fed into an apparatus for forming a compressed grouping of objects (i.e., stickpack).

The timing belt wraps around all of the timing pulleys located at the base of the cone assemblies and also wraps around a pulley attached to the motor. One skilled in the art, however, will appreciate other obvious methods of rotating the cone assemblies within the cylinders of the cone block may be used. For example, each cone assembly may be rotated by a single motor, or several cone assemblies may be geared or belted together to be run off a single motor.

Movement of the transport conveyor belt 36 may be accomplished by a separate motor 40. The conveyor winds around various pulleys and tensioners to insure that the belt has adequate tension to support and transport candies positioned in the transport lanes.

During operation, at certain times, candies fed from the hopper become stuck near the base of the cone body or between the cone assembly and the cylinder wall. In order to reposition these stuck candies within the cylinder, the relative rotation of the apparatus is reversed, or oscillated between rotation in one direction and rotation in an opposite direction, at predetermined intervals for a predetermined period of time. This reverse rotation quickly re-orientates the stuck candies to another position which makes them easier to sort and feed out of the device.

The interval time and time period for counter rotation are dependent upon the particular object to be sorted. These times are generally obtained through trial and error.

However, the time intervals for counter rotation and the period of time associated thereto may also be determined by placing electrical or mechanical sensors at locations within the cylindrical opening or the outlet to determine whether candies are wedged between the cone assembly and cone block.

For example, if sensors indicate a jamming condition exists, the drive motor would be signaled to briefly reverse direction for a period of time until the sensor indicates that the jamming condition no longer exists. At that point, feeding rotation would be re-established.

Each cone assembly, and/or cylinder, may include a separate drive motor, as stated earlier, so that each may be individually counter-rotated dependent upon the state of jamming detected by the sensors. In that way, only individual feeders would have to counter rotate instead of the entire array of feeders.

For cost efficiency, the present invention is shown using 16 feeders all connected to one motor. Thus, using predetermined times and time period for counter rotation for the candy to be sorted and fed, all 16 cone assemblies are stopped and counter rotated at the same time for the same time period.

The 16 feeder arrangement may ultimately form one, two, four or eight stickpacks comprising sixteen, eight, four and two pieces of candy, respectively.

Accordingly, different colors or flavors of a particular type of candy may be sorted and assembled in a parallel arrangement for assembly into a stickpack using the apparatuses and methods according to the present invention.

It is noted that one skilled in the art will appreciate that the teachings of the present invention may also be used in mixing and compressing objects having different sizes and shapes, and objects including non-food items such as mechanical nuts.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A apparatus for sequentially sorting and feeding a plurality of objects in a serial arrangement, said objects having a specific orientation, said apparatus comprising:
   a. a hollow receiving member having a generally cylindrical shape and an inner wall, said receiving member having an inlet adjacent one end for receiving a plurality of randomly orientated objects and a substantially closed end with an outlet for sequentially feeding out correctly orientated objects in a serial arrangement; and
   b. a generally cylindrical inner member centrally aligned within said hollow receiving member, said inner member having an outer wall being spaced apart from said inner wall of said hollow receiving member to define a space adapted for receiving a correctly orientated object for serial feeding, wherein an upper portion of said outer wall inclines toward said inner wall of said hollow receiving member, at least one of said inner member and said hollow receiving member rotate relative to one another in a feeding direction to sequentially feed said objects out said outlet, and wherein said generally cylindrical member and said hollow receiving member also rotate in a direction opposite to said feeding direction at predetermined intervals.

2. The apparatus according to claim 1, wherein at least one of said inner member and said hollow receiving member is rotated relative to one another in a direction opposite to said feeding direction when an objected is jammed within said feeding apparatus.

3. The apparatus according to claim 1, wherein at least one of said inner member and said hollow receiving member are rotated relative to one another in a direction opposite to said feeding direction at said predetermined interval for a predetermined period of time.

4. The apparatus according to claim 3, wherein at least one of said inner member and said hollow receiving member are rotated relative to one another in a direction opposite to said feeding direction when an objected is jammed within said feeding apparatus.

5. The apparatus according to claim 1, further comprising a sweeping member positioned on said outer wall of said inner cylindrical member.

6. The apparatus according to claim 1, further comprising a disc having a plurality of holes positioned thereon, said disc being positioned at the base of said receiving member and said cylindrical inner member for allowing air to flow from the inlet of said hollow receiving member through said disc.

7. The apparatus according to claim 1, further comprising a transport conveyor positioned at the outlet of said receiving member for transporting correctly orientated objects away from said feeder.

8. The apparatus according to claim 1, further comprising a timing pulley attached to said receiving member or said inner member, said timing pulley allowing said feeder to be linked to a plurality of feeders via a timing belt driven by a motor to provide rotation to the feeding apparatus.

9. An apparatus for supplying a plurality of objects at a specific orientation and in a parallel arrangement, said apparatus comprising
   a. a plurality of feeders for sequentially sorting and feeding in a serial arrangement correctly orientated objects, each said feeder comprising:
      1. a hollow receiving member having a generally cylindrical shape and an inner wall, said receiving member having an inlet adjacent one end for receiving a plurality of randomly orientated objects and a substantially closed end with an outlet for sequentially feeding in serial arrangement correctly orientated objects; and
      2. a generally cylindrical inner member centrally aligned within said hollow receiving member, said inner member having an outer wall spaced apart from said inner wall of said hollow receiving member to define a space adapted for receiving a correctly orientated object for serial feeding, wherein an upper portion of said outer wall inclines toward said inner wall of said hollow receiving member, at least one of said inner member and said hollow receiving member rotate relative to one another in a feeding direction to sequentially feed said objects out said outlet, and wherein said inner member and said hollow receiving member also partially rotate in a direction opposite to said feeding direction at predetermined intervals; and
   b. a plurality of transport conveyors each having an end positioned at each of said outlets of said feeders for transporting correctly orientated objects away from a particular said feeding device, wherein said transport conveyors are positioned along side each other to provide a plurality of parallel arranged and correctly orientated objects.

10. The apparatus according to claim 9, wherein at least one of said inner member and corresponding said hollow receiving member are rotated relative to one another in a direction opposite to said feeding direction at said predetermined interval for a predetermined period of time.

11. The apparatus according to claim 9, further comprising a sweeping member positioned on said outer wall of each said inner member.

12. The apparatus according to claim 9, further comprising a disc having a plurality of holes positioned thereon, said disc being positioned at the base of each said receiving member and corresponding said cylindrical inner member for allowing air to flow from the inlet of said hollow receiving member through said disc.

13. The apparatus according to claim 9, further comprising a timing pulley attached to each said receiving member or said inner member, said timing pulley allowing said feeder to be linked to a plurality of feeders via a timing belt driven by a motor providing rotation to the feeding apparatus.

14. A method for sequentially sorting and feeding a plurality of objects in serial arrangement, said objects having a specific orientation when sorted, said method comprising the steps of:

a. receiving a plurality of randomly orientated objects into a feeder apparatus between the inner wall of a hollow receiving member having a generally cylindrical shape, and the outer wall of a generally cylindrical inner member centrally aligned within said hollow receiving member, said outer wall of said inner member being spaced apart from said inner wall of said hollow receiving member to define a space adapted for receiving a correctly orientated object;

b. rotating at least one of said inner member and said receiving member relative to one another in a feeding direction to sort and feed objects out of the bottom of said hollow receiving member; and c. rotating at least one of said inner member and said receiving member relative to one another in a direction opposite to said feeding direction at a predetermined interval.

15. The method according to claim 14, wherein during said rotating step, at least one of said receiving member and said inner member is rotated relative to one another in a direction opposite to said feeding direction when an object is jammed within said feeder.

16. The method according to claim 14, wherein at least one of said inner member and said hollow receiving member are rotated relative to one another in a direction opposite to said feeding direction at said predetermined interval for a predetermined period of time.

17. The method according to claim 14, wherein said cylindrical inner member includes a sweeping member positioned on said outer wall of said inner cylindrical member.

18. The method according to claim 14, further comprising a disc having a plurality of holes positioned thereon, said disc being positioned at the base of said receiving member and said inner member for allowing air to flow from the inlet of said hollow receiving member through said disc.

19. The method according to claim 14, further comprising the step of transporting sorted objects away from said feeder with a transport conveyor positioned at the outlet of said receiving member for transporting correctly orientated objects away from said feeder.

* * * * *

UNITED STATES PATENT AND TRADEMARK OFFICE
CERTIFICATE OF CORRECTION

PATENT NO. : 6,315,102 B1
DATED : November 13, 2001
INVENTOR(S) : Michael Mcgee et al.

It is certified that error appears in the above-identified patent and that said Letters Patent is hereby corrected as shown below:

Column 1,
Line 21, "amounts" should read -- amounts of --.

Column 2,
Line 61, "Figure." should read -- Figure 1.--.

Column 4,
Line 23, "then" should read -- the --.

Column 5,
Line 36, "A" should read -- An --; and
Line 63, "A" should read -- An --.

Column 6,
Line 63, "A" should read -- An --.

Signed and Sealed this

Twenty-first Day of May, 2002

Attest:

Attesting Officer

JAMES E. ROGAN
*Director of the United States Patent and Trademark Office*